United States Patent [19]

McAuliffe et al.

[11] 4,131,833

[45] Dec. 26, 1978

[54] ARRANGEMENT FOR TAPPING BATTERY BANK ALTERNATELY FROM OPPOSITE ENDS

[75] Inventors: Gerald N. McAuliffe; Eldon W. Wooters, both of Lincoln, Nebr.

[73] Assignee: Outboard Marine Corporation, Waukegan, Ill.

[21] Appl. No.: 790,534

[22] Filed: Apr. 25, 1977

[51] Int. Cl.$^2$ ............................................. H02M 1/08
[52] U.S. Cl. ..................................... 318/440; 307/81; 320/18
[58] Field of Search ................... 318/440; 307/65, 66, 307/81 A, 80; 320/18 A, 15

[56] References Cited

U.S. PATENT DOCUMENTS

| 438,145 | 10/1890 | Currie | 320/18 |
|---|---|---|---|
| 688,009 | 12/1901 | Siegal et al. | 307/81 |
| 1,583,517 | 5/1926 | Barany | 320/18 |
| 2,353,410 | 7/1944 | Marshall et al. | 320/18 |

Primary Examiner—Herman Hohauser
Attorney, Agent, or Firm—Michael, Best & Friedrich

[57] ABSTRACT

Disclosed herein is a direct current motor control or energizing circuit comprising a direct current motor, a bank of series connected batteries, which bank includes opposite ends, and a switching arrangement for electrically disconnecting and connecting the bank to the motor for energizing of the motor at selective levels of potential and so that successive energizations involve alternate connection of the motor from the opposite ends of the bank to at least one of the batteries.

28 Claims, 8 Drawing Figures

ARRANGEMENT FOR TAPPING BATTERY BANK ALTERNATELY FROM OPPOSITE ENDS

BACKGROUND OF THE INVENTION

The invention relates to arrangements for supplying direct current to direct current motors. More particularly, the invention relates to arrangements for variably supplying power from a bank of batteries to a direct current motor such as is adapted for driving small vehicles.

SUMMARY OF THE INVENTION

The invention provides a direct current motor energizing circuit comprising a direct current motor, a bank of series connected batteries, which bank includes opposite ends, and switch means for electrically disconnecting and connecting the bank to the motor for energizing of the motor at selective levels of potential, and so that successive energizations involve alternate connection of the motor from the opposite ends of the bank to at least one of the batteries.

In one embodiment in accordance with the invention, there is provided a direct current motor energizing circuit comprising a direct current motor, a bank of series connected batteries including a positive end terminal and a negative end terminal, a speed control switch including a plurality of contacts connected to the battery bank, a switch contact, and an actuator operative to selectively electrically connect and disconnect the switch contact with the contacts of the plurality of contacts, and means electrically connecting the motor to the battery bank and to the switch contact and electrically connecting the plurality of contacts to the battery bank including switch means operative in response to operation of the actuator to alternately electrically connect one or more of the batteries to the motor so as to drive the motor in a given direction and so as to drain the batteries from one of the end terminals of the battery bank and to electrically connect one or more of the batteries to the motor so as to drive the motor in the given direction and so as to drain the batteries from the other of the end terminals of the battery bank.

In one embodiment in accordance with the invention, there is provided a direct current motor control energizing circuit comprising a direct current motor, a bank of series connected batteries including a positive end terminal and a negative end terminal, a speed control switch including a first plurality of contacts connected to the battery bank and including a first end contact, a second plurality of contacts connected to the battery bank and including a second end contact, a first switch contact, a second switch contact, and an actuator operative to selectively electrically connect and disconnect the first switch contact with the contacts of the first plurality of contacts and to selectively electrically connect and disconnect the second switch contact with the contacts of the second plurality of contacts, and switch means connected to the end contacts, to the motor, and to the end terminals of the battery bank and operative in response to operation of the actuator to alternately electrically connect one or more of the batteries to the motor so as to drive the motor in a given direction and so as to drain the batteries from one of the end terminals of the battery bank and to electrically connect one or more of the batteries to the motor so as to drive the motor in a given direction and so as to drain the batteries from the other of the end terminals of the battery bank.

One of the principal features of the invention is the provision of a control circuit for connecting a direct current motor to a bank of series connected batteries in such a manner so as to drain power alternately from the opposite ends of the battery bank.

Another of the principal features of the invention is the provision of a direct current motor control or energizing circuit in which a direct current motor is alternately connected to the opposite ends of a bank of series connected batteries so as to obtain more even discharge of the batteries.

Other features and advantages of the embodiments of the invention will become known by reference to the following general description, the claims and the appended drawings.

Before explaining the embodiments of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

GENERAL DESCRIPTION

Figures 1, 2, 3:
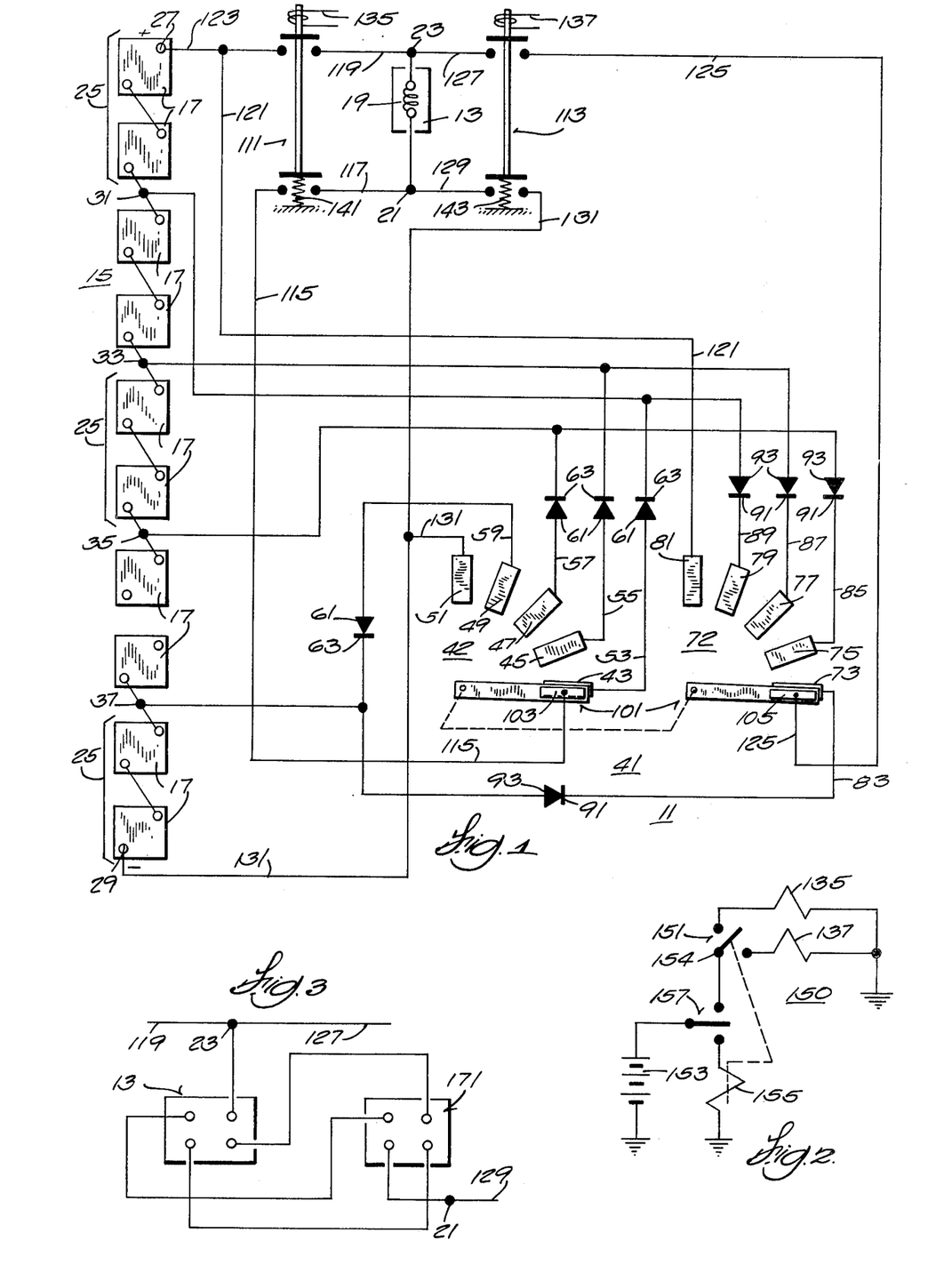
FIG. 1 is a schematic view of a part of a direct current motor control circuit embodying various of the features of the invention.
FIG. 2 is a schematic view of another part of the direct current motor control circuit shown in FIG. 1.
FIG. 3 is a schematic view of a modification of the control circuit shown in FIG. 1.

Schematically shown in FIG. 1 of the drawings is a circuit 11 for energizing a direct current motor 13 from a bank 15 of series connected batteries 17 in such manner as to more evenly discharge the batteries in the bank. More specifically, the circuit 11 is operative to energize the motor 13 at increasing levels or potential and is further operable so that successive energization of the motor from zero potential involves alternate connection of the motor to one or more of the batteries 17 from the opposite ends of the bank 15.

Still more specifically, the direct current motor 13 can include both an armature winding and a field winding or can be a permanent magnet motor including only a single winding. In FIG. 1, the motor 13 is schematically illustrated as including a winding 19 having opposite terminals 21 and 23.

Any suitable number of batteries 17 can be employed. In the illustrated construction ten six volt batteries are shown. The batteries 17 are arranged in five sub-banks 25 each including two of the series connected batteries 17. The battery bank 15 includes a positive end terminal 27, a negative end terminal 29, and first, second, third and fourth intermediate terminals 31, 33, 35 and 37 located between each of the sub-banks 25 or at 12 volt potential differences from each other. The intermediate terminals could be one of the adjacently connected battery terminals. Of course, other size batteries and other potential differences between the intermediate terminals can be employed.

Included in the circuit 11 is a speed control switch 41 including a first arcuately arranged plurality of contacts 42 including a series of first, second, third and fourth contacts 43, 45, 47 and 49, respectively, and a last or end contact 51. The first, second, third and fourth contacts 43, 45, 47 and 49 are respectively connected to the first, second, third and fourth intermediate terminals 31, 33, 35 and 37 by respective leads 53, 55, 57 and 59 which respectively include diodes 61 arranged with the cathodes 63 thereof connected to the intermediate terminals.

The speed control switch 41 further includes a second arcuately arranged plurality of contacts 72 including a second series of first, second, third and fourth contacts 73, 75, 77 and 79, respectively, and a second last or end contact 81. The first, second, third and fourth contacts 73, 75, 77 and 79 are respectively connected to the fourth, third, second and first intermediate terminals 37, 35, 33 and 31 by respective leads 83, 85, 87 and 89 which respectively include diodes 91 arranged with their anodes 93 connected to the intermediate terminals.

The speed control switch further includes an actuator 101 such as a foot pedal. In the schematic illustration, the actuator 101 is illustrated twice but can be one member or structure, and has operatively connected thereto first and second switch contacts 103 and 105, respectively, which, in response to movement of the actuator 101, are respectively successively engageable with the first and second plurality of contacts. In this regard, the actuator 101 is movable to and from a disconnect position in which the first and second switch contacts 103 and 105 are electrically disconnected from the first and second plurality of contacts 42 and 72. When the actuator 101 is moved from the disconnect position, the switch contacts 103 and 105 are successively engaged with the first, second, third, fourth and last or end contacts of the first and second pluralities of contacts 42 and 72.

The speed control switch 41 and the bank 15 of batteries 17 are connected to the direct current motor 13 through first and second normally open switches 111 and 113, respectively, which are alternately closed so as to alternately operate the motor 13 through the first and second pluralities of contacts 42 and 72 and thereby to alternately energize the motor 13 from opposite ends of the battery bank 15.

More particularly, the first normally open switch 111 is operable, upon closure, to electrically connect a lead 115 extending from the first switch contact 103 to a lead 117 connected to the motor terminal 21. In addition, the first normally open switch 111 is operable, upon closure, to electrically connect a lead 119 extending from the other terminal 23 of the motor 13 to a lead 121 extending from the last or end contact 81 in the second plurality of contacts 72 and to a lead 123 extending from the positive end terminal 27 of the battery bank 15.

The second normally open switch 113 is operative, upon closure, to electrically connect a lead 125 extending from the second switch contact 105 to a lead 127 connected to the motor terminal 23. In addition, the second normally open switch is operable, upon closure, to electrically connect a lead 129 extending from the terminal 21 of the motor 13 to a lead 131 extending from the last or end contact 51 of the first plurality of contacts 42 and extending from the negative end terminal 29 of the battery bank 15.

The first and second switches 111 and 113 are alternately closed in response to return movement of the actuator to the disconnect position. In this regard, the first and second switches 111 and 113 respectively preferably include solenoid coils 135 and 137 operating against the action of a compression spring 141 and 143 to close the switches upon energizing of the solenoid coils 135 and 137.

The coils 135 and 137 are actuated (See FIG. 2) by a sub-circuit 150 which, in addition to the coils 135 and 137 includes a source of current, such as a battery 153, together with a cycling or stepping switch 151 which includes an input terminal 154 and which is operated by a solenoid coil 155, and a micro or other switch 157 which is operated by the actuator 101. More particularly, the switch 157 is arranged so that when the actuator 101 is displaced from the disconnect position, the battery 153 is connected to the input terminal 154 of the cycling switch 151 which, in turn, is alternately connected to the coils 135 and 137 in response to operation of the cycling switch. When the actuator 101 is in the disconnect position, the connection of the battery 153 to the cycling switch 151 is interrupted, thus additionally de-energizing motor 13. In addition, when the actuator 101 is in the disconnect position, the battery 153 is connected to the solenoid coil 155 of the cycling switch 151 so as to operate the switch through one step. The cycling switch 151 is constructed so as to alternately energize the coils 135 and 137 incident to successive steps. Thus, during the step when the coil 135 is disconnected by the cycling switch 151, the switch 111 is opened by the spring 141, and during the step when the coil 137 is disconnected by the cycling switch 151, the switch 113 is opened by the action of the spring 143. The connection of the battery 153 through the cycling switch solenoid coil 155 is opened when the actuator 101 is moved from the disconnect position.

Accordingly, whenever the actuator 101 is operated so as to move the switch contacts 103 and 105 relative to the plurality of contacts 42 and 72, the motor 13 will be operated through one of the plurality of contacts 42 and 72 at a desired potential level and, accordingly, at a desired speed. Upon return of the actuator 101 to the disconnect position, the motor 13 is disconnected or de-energized by reason of disconnection of the switch contacts 103 and 105 from the plurality of contacts 42 and 72 and by reason of disconnection of the input terminal 154 from the current source 153. In addition, upon return of the actuator 101 to the disconnect position, the stepping switch 151 is operated so that, upon the next movement of the actuator 101 to again connect the movable switch contacts 103 and 105 with the fixed contacts, the motor 13 will be operated through the other of the plurality of contacts 42 and 72 and so as thereby to drain power from the batteries 17 in the opposite direction from that which was employed during the preceding movement of the actuator 101 from the disconnect position.

As shown in FIG. 3, a conventional reversing switch 171 can be incorporated in the circuit with the motor 13 between terminals 23 and 21 so as to permit reversal of the motor 13 and thereby provide for reversing operation. As it is well known to combine reversing switches and motors as shown in FIG. 3 to afford both forward and reverse electrical operation of the motor 13, no further explanation is believed to be necessary.

Figure 4:
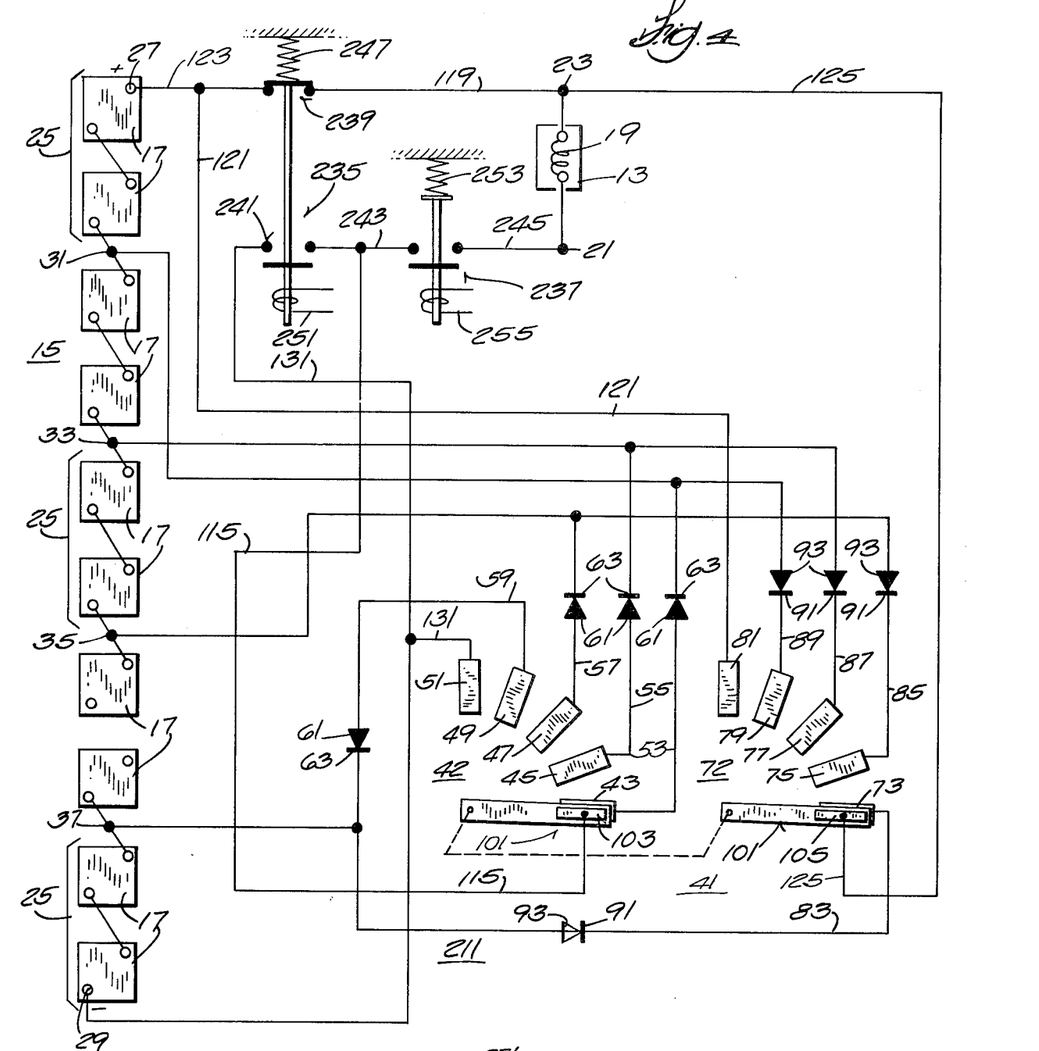
FIG. 4 is a schematic view of a part of another direct current motor control circuit embodying various of the features of the invention.

Shown in FIG. 4 is another embodiment of a control circuit 211 which embodies various of the features of the invention. The circuit 211 shown in FIG. 4 is the same as the circuit 11 shown in FIG. 1 except that the leads 115, 121, 123, 125, 131 are connected to the motor 13 through a different switching arrangement which is cycled by a different cycling arrangement. Accordingly, identical reference numbers have been applied to the components of the circuit 211 shown in FIG. 4 which are the same as the components of the circuit 11 shown in FIG. 1. No further explanation is therefore believed to be necessary with respect to the components of the circuit 211 which have the same reference numerals as the same components of the circuit 11.

In the control circuit 211 shown in FIG. 4, the leads 115, 121, 123, 125 and 131 are connected to the motor terminals 21 and 23 through a double pole switch 235 and through a single pole switch 237. More particularly, the double pole switch 235 includes a normally closed switch 239 which connects the leads 121 and 123 to the lead 119 which, in turn, is connected to the motor terminal 23.

In addition, the double pole switch 235 includes a normally open switch 241 which, when closed, connects the lead 131 to each of the lead 115 and a lead 243.

The single pole switch 237 is normally open and, when closed, connects the lead 243 to a lead 245 connected to the motor terminal 21.

The double pole switch 235 is biased so as to close the switch 239 and to open the switch 241 by a suitable compression spring 247 and is operable against the action of the spring 247 to close the switch 241 and to open the switch 239 in response to energizing of a solenoid coil 251.

The single pole switch 237 is biased so as to be in the open position by a suitable compression spring 253 and is operable against the action of the spring 253 to close the switch 237 in response to energizing of a solenoid coil 255.

The coils 251 and 255 are actuated (See FIG. 5) by a sub-circuit 250 which, in addition to the coils 251 and 255 includes a souce of current, such as a battery 253, together with a cycling or stepping switch 271 operated by a solenoid coil 273, and a micro or other switch 275 which is operated by the actuator 101. More particularly, the switch 275 is suitably biased for normal engagement or connection with the terminal 279 and is arranged so that, when the actuator 101 is displaced to the disconnect position, the engagement of the switch 275 with the terminal 279 is interrupted and the switch 275 is engaged with or connected to the terminal 281. Thus, when the actuator 101 is displaced from the disconnect position, the battery 253 is connected to the coil 255 so as to close the switch 237. In addition, the switch 275 is also connected to the cycling switch 271 which, in turn, is connected to the coil 251. When the actuator 101 is in the disconnect position, the connection of the battery 153 to the coil 255 and the cycling switch 271 is interrupted, thus permitting opening of the single pole switch 237 by the spring 253 and thereby deenergizing motor 13. In addition, when the actuator 101 is in the disconnect position, the battery is connected to the solenoid coil 273 of the cycling switch 271 so as to operate the switch 271 through one step. The cycling switch 271 is constructed so as to alternately open and close the circuit to the coil 251 incident to successive steps. Thus, during the step when the coil 251 is disconnected from the battery 253, the switch 239 is closed and the switch 241 is opened in response to the action of the spring 247. During the step when the coil 251 is connected through the cycling switch 271 to the battery, the switch 239 is open and the switch 241 is closed against the action of the spring 247. The connection of the battery 253 through the cycling switch solenoid coil 273 is open when the actuator 101 is moved from the disconnect position.

Figure 5:
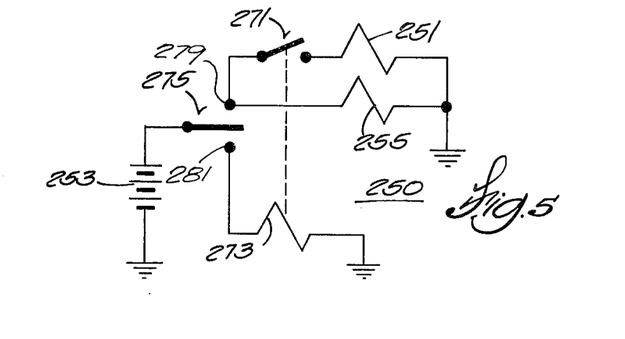
FIG. 5 is a schematic view of another part of the direct current motor control circuit shown in FIGS. 4, 6 and 7.

Accordingly, successive actuations of the actuator 101 relative to the disconnect position will cause connection of the battery bank 15 to the motor 13 in reverse relation, thereby draining the batteries 17 in the bank 15 at a more even rate.

The embodiment shown in FIGS. 4 and 5 can also be employed with a conventional reversing switch as referred to herein before in connection with FIG. 3.

Figure 6:
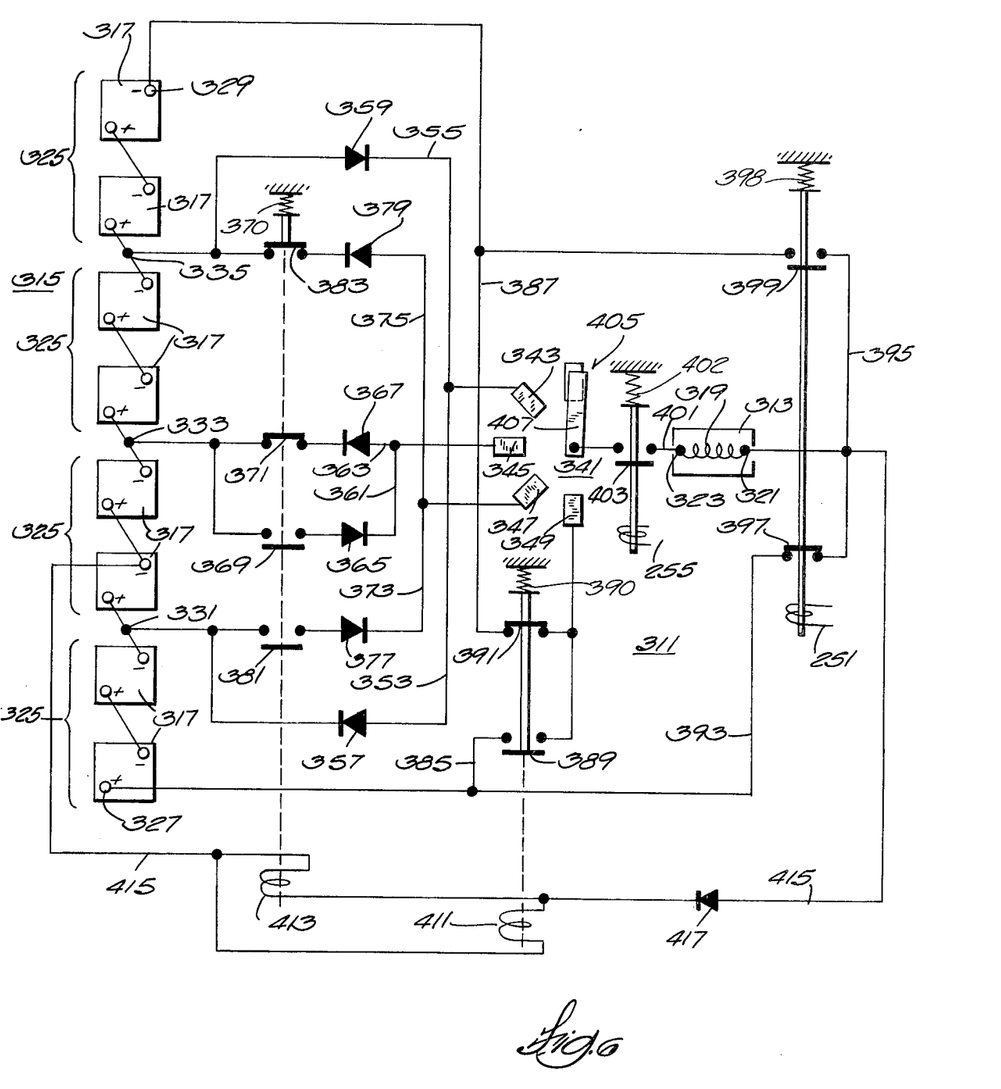
FIG. 6 is a schematic view of a part of still another direct current motor control circuit embodying various of the features of the invention.

Shown in FIG. 6 is still another embodiment of a direct current motor energizing circuit 311 which embodies various of the features of the invention, which utilizes only a single actuator, and which incorporates the sub-circuit 250 shown in FIG. 5. The circuit 311 controls the speed of a motor 313 which can include both an armature winding and a field winding or can be a permanent magnet motor including only a single winding. The motor 313 is schematically illustrated as including a winding 319 having opposite terminals 321 and 323.

The motor 313 is powered by a battery bank 315 which can include any suitable number of batteries 317. In the illustrated construction, eight six-volt batteries are shown. The batteries 317 are arranged in four sub-banks 325 each including two series connected batteries 317. The battery bank 315 includes a positive end terminal 327, a negative end terminal 329, and first, central and second intermediate terminals 331, 333 and 335, respectively located between each of the sub-banks 325 or at twelve-volt potential differences from each other. The intermediate terminals could be one of the adjacently connected battery terminals. Of course, other size batteries and other potential differences between the intermediate terminals can be employed.

Included in the circuit 311 is a speed control switch 341 including an arcuately arranged plurality of contacts including a series of first, second, third and fourth or end contacts 343, 345, 347 and 349.

The first contact 343 is connected to the first and second intermediate battery terminals 331 and 335 through parallel, oppositely oriented, uni-directional flow paths provided by respective leads 353 and 355 which respectively include oppositely oriented diodes 357 and 359.

The second contact 345 is connected to the central intermediate terminal 333 through parallel, oppositely oriented uni-directional flow paths provided by leads 361 and 363 which respectively include oppositely oriented diodes 365 and 367. In addition, the leads respectively include switches 369 and 371 which will be referred to hereinafter.

The third contact 347 is connected to the first and second intermediate terminals 331 and 335 through parallel, oppositely oriented uni-directional flow paths which are provided by leads 373 and 375 respectively including oppositely oriented diodes 377 and 379 and switches 381 and 383 which will be referred to hereinafter. The diodes 377 and 357 are oppositely oriented and the diodes 359 and 379 are oppositely oriented.

The fourth or end contact 349 is connected to the end terminals 327 and 329 of the battery bank 315 through respective leads 385 and 387 including respective switches 389 and 391 which will be referred to hereinafter.

The end terminals 327 and 329 of the battery bank are also respectively connected to the terminal 321 of the motor 313 by respective leads 393 and 395 which include respective switches 397 and 399 which will be referred to hereinafter.

The other terminal 323 of the motor 313 is connected by a lead 401 including a switch 403 to a switch contact 405 carried by a movable actuator 407, such as an accelerator pedal or other manually operated control, which actuator 407 comprises a part of the speed control switch and is arranged for movement to and from a disconnect position shown in full lines in FIG. 6 and to and from selective positions connecting the switch contact 405 to the contacts 343, 345, 347 and 349.

The circuit 311 is controlled by operation of the actuator 407 and by the sub-circuit 250 which is operated by the actuator 407.

The switch 403 can be of any suitable construction, and in the disclosed construction, the switch 403 is operated by a solenoid including the coil 255 which is a part of the sub-circuit 250 shown in FIG. 5, is suitably biased by a compression spring 402 to the open position, and is closed in response to energizing of the solenoid coil 255.

The switches 397 and 399 can be of any suitable construction, and in the disclosed construction, the switches 397 and 399 are operated by a solenoid including a coil 251 which is a part of the sub-circuit 250 shown in FIG. 5. The switches 397 and 399 are biased by a tension spring 398 and are arranged so that the switch 399 is suitably biased closed and the switch 397 is suitably biased open and so that energizing of the solenoid coil 251 opens the switch 399 and closes the switch 397. In FIG. 6, the switches 397 and 399 are shown in condition when the coil 251 is energized.

The switches 389 and 391 can also be of any suitable construction, and in the disclosed construction, are operated by a solenoid including a coil 411, are biased by a tension spring 390, and are arranged so that the switch 389 is suitably biased closed and the switch 391 is suitably open and so that energizing of the solenoid coil 411 opens the switch 389 and closes the switch 391. In FIG. 6 the switches are shown in the condition when the coil 411 is energized.

The switches 369, 371, 381 and 383 can also be of any suitable construction, and in the disclosed construction, the switches 369, 371, 381 amd 383 are operated by a solenoid including a coil 413, are biased by a tension spring 370, and are arranged so that the switches 369 and 381 are suitably biased closed and the switches 371 and 383 are suitably biased open and so that energizing of the solenoid coil 413 opens the switches 369 and 381 and closes the switches 371 and 383. In FIG. 6 the switches 369, 371, 381 and 383 are shown in the condition with the coil 413 energized.

The solenoid coils 411 and 413 are energized when the switch 397 is closed. More specifically, the solenoid coils 411 and 413 are arranged in parallel relation to each other in a lead 415 which includes a diode 417 and which extends between one of the battery terminals, as for instance, the battery terminal 327, and the lead 393 at a point between the switch 397 and the motor terminal 321. Thus, when the switch 397 is closed, the solenoid coils 411 and 413 are actuated to open the switches 369, 381 and 389 and to close the switches 371, 383 and 391. When the switch 397 is opened and consequently the solenoid coil 411 and 413 are not energized, the switches 369, 381 and 389 are closed and the switches 371, 383 and 391 are opened.

The stepping sub-circuit 250 shown in FIG. 5 is actuated by the foot switch 275 which is operated in response to movement of the actuator 407 and which is suitably biased into engagement with the terminal 279 leading to the solenoid coil 255 and to the stepping switch 271. When the actuator 407 is moved to the disconnect position shown in full lines in FIG. 6, connection of the switch 275 to the terminal 279 is interrupted and the switch is connected to the terminal 281 thereby energizing the coil 273 so as to step the switch 271 between its open and closed positions. When the actuator 407 is again moved into contact with the first contact 343, the switch 275 again connects the switch 275 with the terminal 279, which connection is continued during engagement of the switch contact 405 with any of the contacts 343, 345, 347 and 349.

Consequently, every time the foot switch 275 is connected to the terminal 279, the coil 255 is activated to operate the switch 403 to connect the motor 313 to the switch contact 405. In addition, every other time the actuator 407 is moved to the disconnect position, the coil 251 will be nonenergized so as thereby to close the switch 399 and to open the switch 397 and consequently to also open the switches 371, 383 and 391 and close the switches 369, 381 and 389. During the intervening movements of the actuator to the disconnect position, the coil 251 is energized with the result that the switch 399 is opened and the switch 397 is closed thereby also closing the switches 371, 383 and 391 and thereby opening the switches 369, 381 and 389.

Accordingly, if the coil 251 is energized, the switches 371, 383, 391 and 397 are closed and the switches 369, 381 389 and 399 are open, and when the switch contact 405 is engaged with the first contact 343, current will flow from the positive end terminal 327 of the battery bank 315 through the switch 397, through the motor 313, through the contacts 343 and 405 through the diode 357 to the intermediate terminal 331 of the battery bank 315 to energize the motor at a 12 volt level. If the switch contact 405 is engaged with the second contact 345, current will flow from the positive end terminal 327 of the battery bank 315 through the switch 397, through the motor 313, through the contacts 345 and 405, and through the diode 367 and switch 371 to the central terminal 333 of the battery bank 315, thereby energizing the motor 313 at a 24 volt level.

If the switch contact 405 is engaged with the third contact 347, current will flow from the positive end terminal 327 of the battery bank 315 through the switch 397 and motor 313, through the contacts 347 and 405, and through the diode 379 nd switch 383 to the second intermediate terminal 335 of the battery bank 315 to thereby energize the motor 313 at a 36 volt level. Finally, if the switch contact 405 is engaged with the fourth or end contact 349, current will flow from the positive end terminal 327 of the battery bank 315 through the switch 397, through the motor 313, through the contacts 349 and 405, and through the switch 391 to the negative end terminal 329 of the battery bank 315, thus energizing the motor 313 at a 48 volt level.

If the coil 251 is de-energized when the switch contact 405 is engaged with the first contact 343, current will flow from the second intermediate terminal 335, through the diode 359, through the contacts 343 and 405, through the motor 313, and through the switch 399 to the negative end terminal 327 of the battery bank 315, thus energizing the motor 313 at a 12 volt level. Similarly, if the switch contact 405 is engaged with the second contact 345, current will flow from the central terminal 333 through the switch 369 and diode 365, through the motor 313, through the switch 399, and return to the negative end terminal 329 of the battery bank 315, thus energizing the motor 313 at a 24 volt level.

Similarly, if the switch contact 405 is connected to the third contact 347, current will flow from the first intermediate battery terminal 331 through the switch 381 and diode 377, through the motor 313, and return through the switch 399 to the negative end terminal 329 of the battery bank 315, thereby energizing the motor 313 at a 36 volt level. If the switch contact 405 is engaged with the fourth contact 349, current will flow from the positive end terminal 327 of the battery bank, through the switch 389, through the contacts 349 and 405, through the motor 313, and through the switch 399 to the negative end teminal 329 of the battery bank 315, thus energizing the motor at 48 volts.

Figure 7:
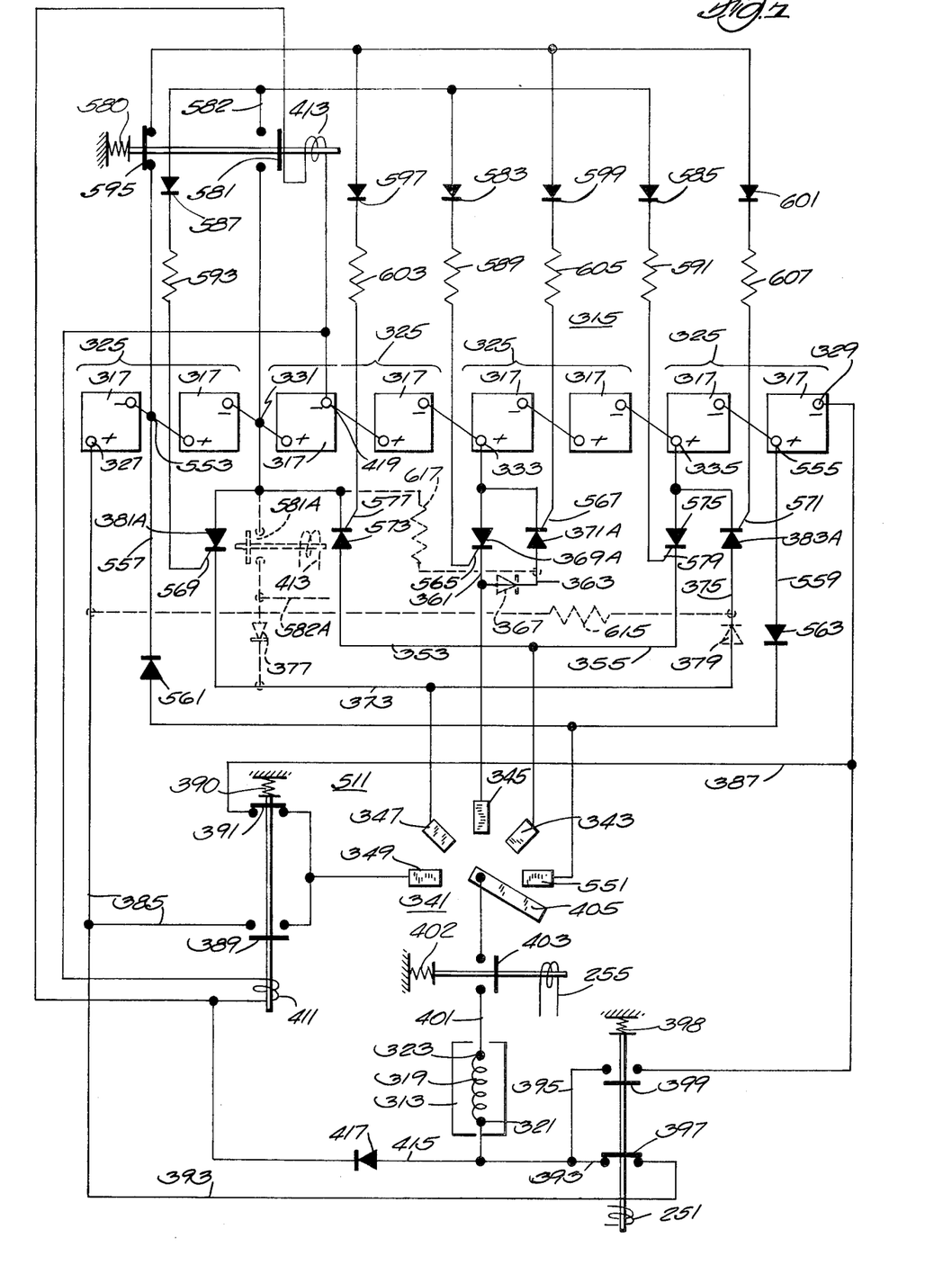
FIG. 7 is a schematic view of a part of still another direct current motor control circuit embodying various of the features of the invention.

Shown in FIG. 7 is a circuit 511 which is generally similar to the circuit 311 and accordingly the same reference numerals have been applied to the components of the circuit 511 shown in FIG. 7 as have been previously applied to the comparable components in the control circuit 311 shown in FIG. 6 and a further explanation as to these components is therefore believed to be unnecessary except as noted below. The circuit 511 also includes the sub-circuit 250 which is connected and operates in the same manner as in the circuit 311. The circuit 511 differs from the circuit 311 in that electronic switches are employed in place of certain of the solenoid actuated switches illustrated in FIG. 6. In addition, the plurality of contacts engaged by the contact switch 405 includes an additional contact 551 which is located in advance of the first contact 343 and which is arranged so as to permit application to the motor 313 of a potential of six volts.

The additional contact 551 is connected to battery terminals 553 and 555 respectively intermediate the terminals 327 and 331 and intermediate the terminals 335 and 329 through two parallel, oppositely oriented uni-directional flow paths provided by leads 557 and 559 which respectively include oppositely oriented diodes 561 and 563.

In addition, the switches 369, 371, 381 and 383 which were illustrated as solenoid switches in FIG. 6 are, in the circuit 511 shown in FIG. 7, in the form of SCR's 369A, 371A, 381A and 383A which include respective gates 565, 567, 569 and 571 and which are arranged to provide uni-directional current flow in the same sense as the diodes 365, 367, 377 and 379. In addition, the leads 353 and 355 also include additional respective switches in the form of SCR's 573 and 575 which include gates 577 and 579 and which are arranged for uni-directional flow in the same sense as the diodes 357 and 359.

Gating or turning on of the SCR's 369A, 381A and 575 is provided by a switch 581 which can be of any suitable construction and which, in the illustrated construction, is operated in the same manner as the switch 381 in the circuit 311 by a solenoid including the coil 413, which is biased by a tension spring 580 so as to be normally closed, and which, when closed, supplies gate current from one of the battery terminals, for example, the battery terminal 331, through a lead 582 to respective diodes 583, 585 and 587 and series connected resistors 589, 591 and 593 to the gate 565, 579 and 569 of the SCR'S 369A, 575 and 381A. In FIG. 7, switch 581 is shown open, i.e., in the condition when the coil 413 is energized.

Gating or turning on of the SCR's 371A, 383A and 573 is provided by a switch 595 which can be of any suitable construction and which, in the illustrated construction, is operated in the same manner as the switch 383 in the circuit 311, which is biased by the tension spring 580 so as to be normally open, which is closed in response to energization by the solenoid coil 413, and which is connected between one of the battery terminals, for example, the battery terminal 553, and respective diodes 597, 599 and 601 and respective series connected resistors 603, 605 and 607 which, in turn, are respectively connected to the gates or 577, 567 and 571 of the SCR's 573, 371A and 383A. In FIG. 7 switch 595 is shown closed, i.e., in the condition when the solenoid coil is energized.

If desired, and as shown in dotted outline in FIG. 7, the SCR 381A and the switch 581 can be combined into a single solenoid switch 581A which can be actuated by the coil 413 and which is connected to the lead 373 through a diode 377. In addition, the gate current diodes 583 and 585 can be connected through the lead 582A extending from between the switch 581A and the diode 377. In this arrangement, the solenoid actuated switch 581A provides both the function of the SCR 381A as well as the gating function of the switch 581.

The solenoid coils 251, 255, 411 and 413 are all actuated as explained in connection with the circuit 311 and no further explanation is believed to be necessary except to note that when the switch contact 405 is connected to the additional contact 551, and when the solenoid coil 251 is de-energized, current flows from the teminal 555 of the battery bank 315 through the additional contact 551 and motor 313, and through the switch 399 to the negative end terminal 329 of the battery bank 315, thus energizing the motor 313 at a six volt level. When the solenoid coil 251 is energized, current flows from the positive end terminal 327 of the battery bank 315 through the switch 397 and through the motor 313 and additional contact 551 and to the battery bank terminal 553.

If desired, and as shown in dotted lines in FIG. 7, a lead including a resistor 615 can be connected in the circuit 511 with one end thereof connected to the lead 375 between the SCR 383A and an additional diode 379 (shown in Dotted outline) in the lead 375 and with the other end thereof connected to the lead 385 between the switch 389 and the positive end terminal 327 of the battery bank 315. Still further, if desired, and as also shown in dotted outline in FIG. 7, another lead including resistor 617 can be connected in the circuit 511 with one end thereof connected between the SCR 371A and an additional diode 367 (shown in dotted outline) in the lead 363 and with the other end thereof connected to the battery terminal 331.

Figure 8:
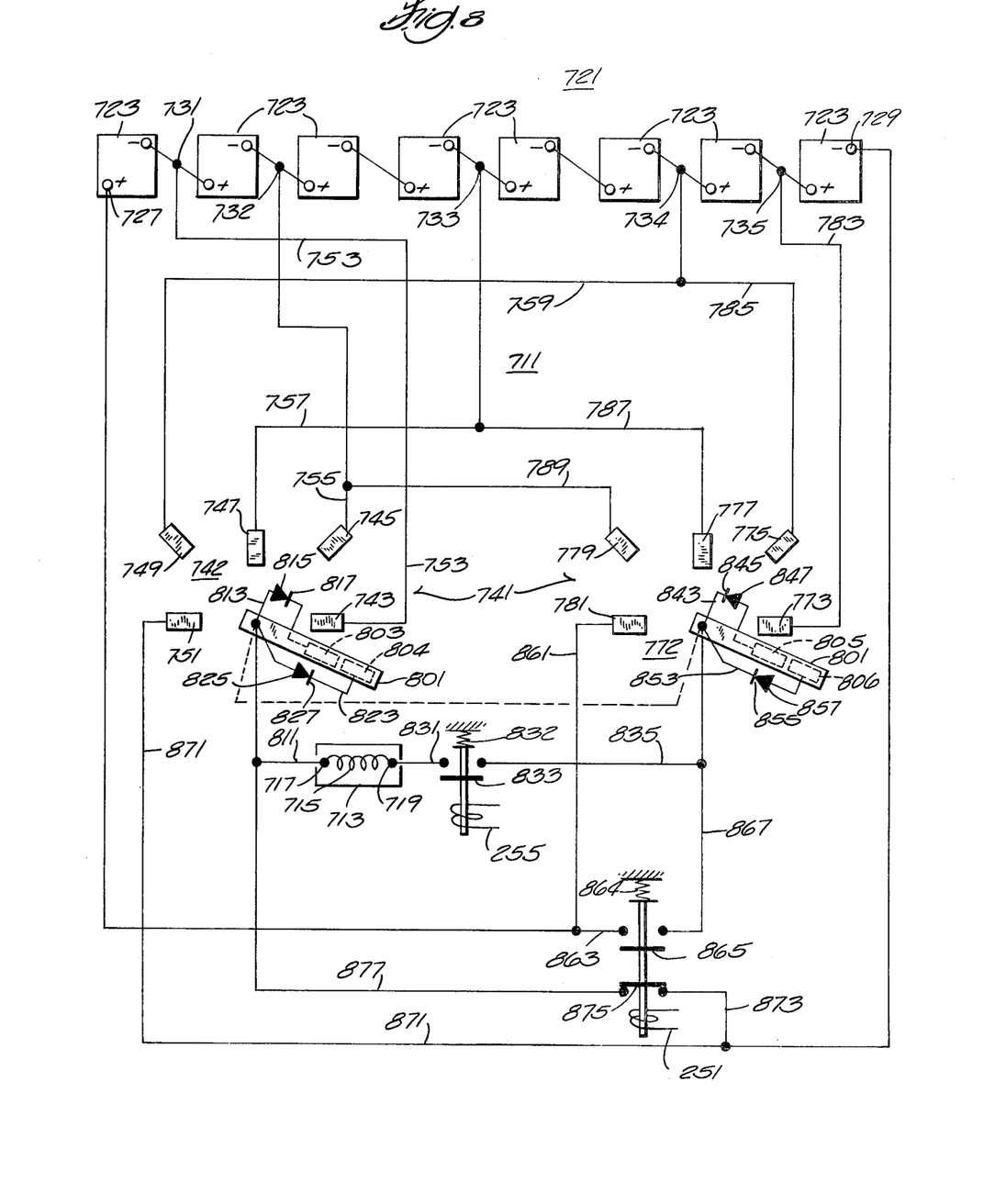
FIG. 8 is a schematic view of a part of still another direct current motor control circuit embodying various of the features of the invention.

Shown in FIG. 8 is still another embodiment of a direct current motor energizing circuit 711 which embodies various of the features of the invention and which includes the sub-circuit 250 shown in FIG. 5. The circuit 711 controls the speed of a motor 713 which can include both an armature winding and a field winding or can be a permanent magnet motor including only a single winding. The motor 713 is schematically illustrated as including a winding 715 having opposite terminals 717 and 719.

The motor 713 is powered by a battery bank 721 which can include any suitable number of batteries 723. In the illustrated construction, eight six-volt batteries are shown. The battery bank 721 includes a positive end terminal 727, a negative end terminal 729, and first, second, central, third and fourth intermediate terminals 731, 732, 733, 734 and 735, respectively. The intermediate terminals could be one of the adjacently connected battery terminals. Of course, other size batteries and various potential differences between the intermediate terminals can be employed.

Included in the circuit 711 is a speed control switch 741 including a first arcuately arranged plurality of contacts 742 including a series of first, second, third and fourth contacts 743, 745, 747 and 749 respectively and a last or end contact 751, which contacts are arranged such that the first, third and end contacts 745, 747 and 751 are arcuately arranged at a first common distance from a common center and such that the second and fourth contacts 745 and 749 are arcuately arranged at a second common distance greater than the first common distance from the common center. The first, second, third and fourth contacts 743, 745, 747 and 749 are respectively connected to the first, second, central and third intermediate terminals 731, 732, 733 and 734 by respective leads 753, 755, 757 and 759.

The speed control switch 741 further includes a second arcuately arranged plurality of contacts 772 including a series of first, second, third and fourth contacts 773, 775, 777 and 779, respectively, and a last or end contact 781, which contacts are arranged such that the first, third and end contacts 773, 777 and 781 are arcuately arranged at a first common distance from a common center and such that the second and fourth contacts 775 and 779 are arcuately arranged at a second common distance greater than the first common distance from the common center. The first, second, third and fourth contacts 773, 775, 777 and 779 are respectively connected to the fourth, third, central and second intermediate terminals 735 734, 733 and 732 by respective leads 783, 785, 787 and 789.

The speed control switch 741 further includes an actuator 801 such as a foot pedal. In the schematic illustration, the actuator 801 is illustrated twice but can be one member or structure, and has operatively connected thereto a first switch contact 803 which, in response to movement of the actuator 801, is successively engageable with the first, third and end contacts 743, 747 and 751 of the first plurality of contacts 742. The actuator 801 also includes a second switch contact 804 which, in response to actuator movement, is successively engageable with the contacts 745 and 749 of the first plurality of contacts 742. Still further, the actuator 801 also includes a third switch contact 805 which, in response to actuator movement, is successively engageable with the contacts 773, 777 and 781 of the second plurality of contacts 772. Still further, the actuator 801 also includes a fourth switch contact 806, which, in response to actuator movement, is successively engageable with the contacts 775 and 779 of the second plurality of contacts 772. The actuator 801 is movable to and from a disconnect position in which the switch contacts 803 through 806 are electrically disconnected from the first and second plurality of contacts 742 and 772 to successive positions of engagement with the first and second plurality of contacts 742 and 772.

It is to be noted that the respective contacts of the first plurality of contacts 742 are engaged simultaneously with the associated contacts of the second plurality of contacts 772. In addition, the contacts of each plurality are preferably designed (although not so shown) so that before disconnection of the first contact in each series, the second contact is engaged and before disconnection of the second contact, the third contact is engaged, and before disconnection of the third contact, the fourth contact is engaged, and before disconnection of the fourth contact the last contact is engaged, and vice versa, thus insuring continuous operation during switching between differential voltage potentials.

The speed control switch 741 and the bank 721 of batteries 723 are connected to the direct current motor 713 so as to alternately operate the motor 713 through the first and second plurality of contacts 742 and 772 and thereby to alternately energize the motor 713 from the opposite ends of the battery bank 721.

More particularly, the terminal 717 of the motor 713 is connected to the first and second switch contacts 803 and 804 through a lead 811 including a branch 813 having a diode 815 arranged with the cathode 817 thereof connected to the switch contact 803. Also included in the lead 801 is a branch 823 which extends in parallel relation to the branch 813 and which includes a diode 825 arranged with the cathode 827 thereof connected to the switch contact 804.

The terminal 719 of the motor 713 is connected by a lead 831 to a switch 833 which, in turn, is connected to the switch contacts 805 and 806 by a lead 835 having a first branch 843 which includes a diode 845 with an anode 847 connected to the switch contact 805 and which further includes a second branch 853 which extends in parallel relation to the branch 843 and which includes a diode 855 having an anode 857 connected to the switch contact 806.

The switch 833 can be of any suitable construction and, in the disclosed construction, is operated by a solenoid including the coil 255 which is part of the sub-circuit 250 shown in FIG. 5. The switch 833 is suitably biased by a compression spring 832 to the open position, and is closed in response to energizing of the solenoid coil 255.

The positive end terminal 727 of the battery bank 721 is connected by a lead 861 to the end terminal 781 of the second plurality of contacts 772 and by a lead 863 to a normally open switch 865 which, in turn, is connected by a lead 867 to the lead 835.

The negative end terminal 729 of the battery bank 721 is connected by a lead 871 to the end terminal 751 of the first plurality of contacts 742 and by a lead 873 to a normally closed switch 875 which, in turn, is connected by a lead 877 to the lead 811.

The switches 865 and 875 can be of any suitable construction, and in the disclosed construction, the switches 865 and 875 are operated by a solenoid including the coil 251 which is part of the sub-circuit 250 shown in FIG. 5. The switches 865 and 875 are biased by a compression spring 864 and are arranged such that the switch 865 is biased open so that the switch 875 is biased closed and such that energizing of the solenoid coil 251 closes the switch 865 and opens the switch 875.

The actuator 801 is connected to the switch 275 forming a part of the sub-circuit 250 in the same way as the actuator 101 of the FIG. 4 construction and the actuator 407 of the construction shown in FIGS. 6 and 7. Thus, when the actuator 801 is moved to the illustrated disconnect position, the solenoid coil 273 is energized to step the switch 271. Movement of the actuator from the disconnect position and into engagement with the first and second plurality of contacts 742 and 772 closes the switch 275 to connect the terminal 279 to the battery 253 and thereby, depending upone the setting of the stepping switch 271, either energizes or de-energizes the coil 251 associated with the switches 865 and 875. In addition, closing of the switch 275 to the terminal 279 automatically energizes the coil 255 thereby closing the switch 833.

Thus, assuming the switch 271 is closed and that, accordingly, the coil 251 is energized, and that the actuator 801 is moved from the disconnect position to the position engaging the contact 803 with the contact 743, current will flow from the positive end terminal 727 through the lead 863 and through the switch 865 which is closed due to energizing of the coil 251. Current then flows through the lead 835, through the closed switch 833, and to the motor winding 715. From the motor winding 715, such current flows through the lead 811, branch 813 including diode 815, through the contacts 803 and 743 and to the battery bank intermediate terminal 731, thereby actuating the motor 713 at a six-volt potential.

Further movement of the actuator 801 from the disconnect position will operate successively to engage the contacts 804 and 745, thereby energizing the motor at a twelve-volt level through the lead 755 and intermediate terminal 732, to engage the contacts 803 and 747, thereby energizing the motor 713 at a 24 volt level through the lead 757 and the intermediate battery bank terminal 733, to engage the contacts 804 and 749, thereby energizing the motor 713 at a 36 volt level through the lead 759 and the intermediate terminal 734, and to engage the contacts 803 and 751, thereby energizing the motor 713 through the lead 871 and the negative end terminal 729 of the battery bank 721.

Upon return of the actuator 801 to the disconnect position, the switch 275 will operate to open the sub-circuit to the coil 255, thereby de-energizing the coil 255 and thereby opening the switch 833 and de-energizing the motor 713. Simultaneously, the switch 275 will energize the coil 273 to operate the stepping switch 271 through one step so that upon the next movement of the actuator 801 from the disconnect position, closure of the switch 275 with the contact 279 will energize the coil 255 but will not energize the coil 251, thereby closing the switch 833 but permitting the switch 865 to remain in its normally open position and permitting the switch 875 to remain in its normally closed position. Assuming the contacts 805 and 773 are engaged, current flows from the intermediate battery bank terminal 735 through the contacts 773 and 805, through the branch line 843 and diode 845, through the lead 835 and switch 833 to the motor winding 715. From the motor winding 715, current flows through the leads 811 and 877, and through the normally closed switch 875, and thence through the lead 873 to the negative battery terminal 729, thereby energizing the motor 713 at the six-volt level.

Further movement of the actuator 801 away from the disconnect position will operate, successively to engage the contact 806 with the contact 775, thereby energize the motor 713 at a twelve-volt level, through the lead 785 and intermediate battery terminal 734 to engage the contact 805 with the contact 777, thereby energizing the motor 713 at a twenty-four volt level through the lead 787 and the central intermediate terminal 733, to engage the contact 806 with the contact 779, thereby energizing the motor 713 at a 36 volt level through the lead 789 and the second intermediate terminal 732, and to engage the contact 805 with the contact 781, thereby energizing the motor 713 at a 48 volt level through the lead 861 and the positive end terminal 727 of the battery bank 421.

As already indicated, the circuits 311, 511 and 711 shown respectively in FIGS. 6, 7 and 8, can also be employed with conventional reversing switches so as to permit reversing of the direction of operation of the motor 313.

Various of the features of the invention are set forth in the following claims.

What is claimed is:

1. A direct current motor energizing circuit comprising a direct current motor, a bank of series connected batteries, said bank including opposite ends, and switch means for electrically disconnecting and connecting said bank to said motor, said switch means including means operable so that successive energizations of said motor are alternately from said opposite ends of said battery bank.

2. A direct current motor energizing circuit comprising a direct current motor, a bank of series connected batteries including a postive end terminal and a negative end terminal, a speed control switch including a first plurality of contacts connected to said battery bank and including a first end contact, a second plurality of contacts connected to said battery bank and including a second end contact, a first switch contact, a second switch contact, and an actuator operative to selectively electrically connect and disconnect said first switch contact with said contacts of said first plurality of contacts and to selectively electrically connect and disconnect said second switch contact with said contacts of said second plurality of contacts, and switch means connected to said end contacts, to said motor, and to said end terminals of said battery bank and operative in response to operation of said actuator alternatively to electrically connect one or more of said batteries to said motor so as to drive said motor in a given direction and so as to drain said batteries from one of said end terminals of said battery bank and to electrically connect one or more of said batteries to said motor so as to drive said motor in said given direction and so as to drain said batteries from the other of said end terminals of said battery bank.

3. A circuit in accordance with claim 2 wherein said motor includes first and second terminals, and wherein said switch means includes a first switch operative upon closure to electricaly connect one of said motor terminals to one of said first and second switch contacts, and to electrically connect the other of said motor terminals to one of said end terminals and to said end contact of one of said plurality of contacts, a second switch operable upon closure to electrically connect one of said motor terminals to the other of said first and second switch contacts and to electrically connect the other of said motor terminals to the other of said end terminals and said end contact of the other of said plurality of contacts, and means operable incident to movement of said actuator relative to a position disconnecting said first and second switch contacts from said first and second plurality of contacts for alternately closing one of said first and second switches and opening of the other of said first and second switches.

4. A direct current motor energizing circuit comprising a direct current motor, a bank of series connected batteries including a positive end terminal, a negative end terminal, and a plurality of intermediate terminals of respectively located between adjacent of said series connected batteries, a speed control switch including a first plurality of contacts including a first series of contacts and a first end contact, a second plurality of contacts including a second series of contacts and a second end contact, a first switch contact, a second switch contact, and an actuator operably movable to selectively electrically connect and disconnect said first switch contact with said contacts of said first plurality of contacts and to selectively electrically connect and disconnect said second switch contact with said contacts of said second plurality of contacts, first leads respectively electrically connecting said contacts of said first series thereof to said intermediate terminals in a first sequence beginning with said intermediate terminal adjacent one of said end terminals and continuing to said intermediate terminal adjacent the other of said end terminals, said first leads respectively including therein first diodes having respective annodes respectively connected to said intermediate terminals, second leads respectively electrically connecting said contacts of said second series thereof to said intermediate terminals in a second sequence opposite to said first sequence, said second leads respectively including therein second diodes having respective cathodes respectively connected to said intermediate terminals, switch means connected to said end contacts, to said motor, and to said end terminals of said battery bank and operative in response to operation of said actuator alternatively to electrically connect one or more of said batteries to said motor as as to drive said motor in a given direction and so as to drain said batteries from one of said end terminals of said battery bank and to electrically connect one or more of said batteries to said motor so as to drive said motor in said given direction and so as to drain said batteries from the other of said end terminals of said battery bank.

5. A circuit in accordance with claim 4 wherein said motor includes first and second terminals, and wherein said switch means includes a first switch operative upon closure to electrically connect one of said motor terminals to one of said first and second switch contacts, and to electrically connect the other said motor terminals to one of said end terminals and to said end contact of one of said plurality of contacts, a second switch operable upon closure to electrically connect one of said motor terminals to the other of said first and second switch contacts and to electrically connect the other of said motor terminals to the other of said end terminals and said end contact of the other of said plurality of contacts, and means operable incident to movement of said actuator relative to a position disconnecting said first and second switch contacts from said first and second plurality of contacts for alternately closing one of said first and second switches and opening of the other of said first and second switches.

6. A circuit in accordance with claim 4 wherein said motor includes first and second terminals, and wherein said switch means comprises a normally open first switch operative upon closure to electrically connect one of said motor terminals to said first switch contact and to electrically connect the other of said motor terminals to one of said end terminals and to said end contact of one of said plurality of contacts, a normally open second switch operable upon closure to electrically connect one of said motor terminals to said second switch contact and to electrically connect the other of said motor terminals to the other of said end terminals and to said end contact of the other of said plurality of contacts, and means operable incident to movement of said actuator relative to a position disconnecting said first and second switch contacts from said first and second plurality of contacts for alternately closing said first and second switch means.

7. A circuit in accordance with claim 6 wherein said first switch is operable to connect the other of said motor terminals to said positive end terminal and to said end contact of said second plurality of contacts.

8. A direct current motor energizing circuit in accordance with claim 6 wherein said first normally open switch includes a first coil operable upon energization thereof to close said first switch, wherein said second normally open switch includes a second coil operable upon energization thereof to close said second switch, wherein said means for alternately closing said first and second switches comprises a cycling switch including an actuating coil and an input terminal, said cycling switch being operable, upon successive actuations thereof, to alternately electrically connect said first and second coils to said input terminal, and an actuating switch operable in response to movement of said actuator to said disconnect position to electrically connect said cycling switch energizing coil to a source of current and operable in response to movement of said actuator from said disconnect position to electrically connect said recycling switch input terminal to a source of current.

9. A circuit in accordance with claim 4 wherein said switch means comprises a normally open first switch operative upon closure to electrically connect said first switch contact to one of said end terminals and to said end contact of one of said plurality of contacts, a normally closed second swtich operable upon closure to electrically connect one of said motor terminals to the other of said end terminals and to said end contact of the other of said plurality of contacts, and means operable incident to movement of said actuator relative to a position disconnecting said first and second switch contacts from said first and second plurality of contacts for alternately closing said first and second switches.

10. A circuit in accordance with claim 9 wherein said first switch is operable to connect said first switch contact ot said negative end terminal and to said end contact of said first plurality of contacts.

11. A circuit in accordance with claim 9 wherein said second switch is connected to one of said motor terminals by a lead, wherein said first switch contact is connected to the other of said motor terminals by another lead, wherein said circuit further includes another normally open switch in one of said leads, and wherein said means for alternately opening and closing said first and second switches is also operable to close said other normally open switch.

12. A direct current motor energizing circuit in accordance with claim 9 wherein said switch means includes a coil operable upon energization thereof to close said first switch and to open said second switch, wherein said means for alternately closing said first and second switches comprises a cycling switch including an actuating coil and an input terminal, said cycling switch being operable, upon successive actuations thereof, to alternately electrically connect said coil to said input terminal and to disconnect said coil from said input terminal and an actuating switch operable in response to movement of said actuator to said disconnect position to electrically connect said cycling switch energizing coil to a source of current and operable in response to movement of said actuator from said disconnect position to electrically connect said recycling switch input terminal to a source of current.

13. A circuit in accordance with claim 12 wherein said second switch is connected to one of said motor terminals by a lead, wherein said first switch contact is connected to the other of said motor terminals by another lead, and wherein said circuit further includes another normally open switch in one of said leads, said other normally open switch including a coil operable, upon energization thereof, to close said other switch, said last mentioned coil being connected to said actuating switch for energization thereof in response to movement of said actuating switch from said disconnect position.

14. A direct current motor energizing circuit comprising a direct current motor, a bank of series connected batteries including a positive end terminal and a negative end terminal, a speed control switch including a plurality of contacts connected to said battery bank, a switch contact, and an actuator operative to selectively electrically connect and disconnect said switch contact with said contacts of said plurality of contacts, and means electrically connecting said motor to said battery bank and to said switch contact and electrically connecting said plurality of contacts to said battery bank including switch means operative in response to operation of said actuator alternatively to electrically connect one or more of said batteries to said motor so as to drive said motor in a given direction and so as to drain said batteries from one of said end terminals of said battery bank and to electrically connect one or more of said batteries to said motor so as to drive said motor in said given direction and so as to drain said batteries from the other of said end terminals of said battery bank.

15. A circuit in accordance with claim 14 wherein said motor includes a first terminal connected to said switch contact and a second terminal, and wherein said switch means includes a first switch operative upon closure to electrically connect said second motor terminal to one of said end terminals of said battery bank, a second switch operable upon closure to electrically connect said second motor terminal to the other of said end terminals of said battery bank and means operable incident to movement of said actuator relative to a position disconnecting said switch contact from said plurality of contacts for alternately closing one of said first and second switches and opening of the other of said first and second switches.

16. A circuit in accordance with claim 15 wherein said battery bank includes an intermediate terminal, and means connecting said intermediate terminal to one of said plurality of contacts including parallel, oppositely oriented, uni-directional first and second flow paths respectively including first and second additional switches, and means for opening and closing said first additional switch concurrently with said first switch and for opening and closing said second additional switch concurrently with said second switch.

17. A circuit in accordance with claim 16 wherein said additional switches are solenoid operated switches.

18. A circuit in accordance with claim 16 wherein said additional switches are SCR's.

19. A circuit in accordance with claim 15 wherein said first switch connects said second motor terminal to said positive terminal of said battery bank, wherein said second switch connects said second motor terminal to said negative terminal of said battery bank, wherein said plurality of contacts includes an end contact, and further including a first additional switch connecting said end contact to said negative terminal of said battery bank, a second additional switch connecting said end contact to said positive terminal of said battery bank, and means for opening and closing said first additional switch concurrently with opening and closing of said first switch and for opening and closing said second additional switch concurrently with opening and closing of said second switch.

20. A sub-circuit in accordance with claim 19 wherein said additional switches are solenoid actuated switches.

21. A circuit in accordance with claim 15 wherein said battery bank includes first and second intermediate terminals, wherein said plurality of contacts includes first and second contacts, means connecting said first contact to said first and second intermediate terminals through respective oppositely oriented, parallel first and second flow paths, means connecting said second contact to said first intermediate terminal through a third uni-directional flow path which is oppositely oriented from said first flow path and which includes a first additional switch, means connecting said second contact to said second intermediate terminal through a fourth uni-directional flow path which is oppositely oriented from said second flow path and which includes a second additional switch, and means for opening and closing said first additional switch concurrently with opening and closing of said first switch and for opening and closing said second additional switch concurrently with opening and closing of said second switch.

22. A circuit in accordance with claim 15 wherein said first switch connects said second motor terminal to said positive terminal of said battery bank, wherein said second switch connects said second motor terminal to said negative terminal of said battery bank, wherein said battery bank includes first and second intermediate terminals and a central terminal intermediate said first and second terminals, and wherein said plurality of contacts includes, in series, first, second, third, and end contacts, means connecting said first contact to said first and second intermediate terminals through respective uni-directional oppositely oriented, parallel first and second flow paths, means connecting said third contact to said first intermediate terminal through a third uni-directional flow path which is oppositely oriented from said first flow path and which includes a first additional switch, means connecting said third contact to said second intermediate terminal through a fourth uni-directional flow path which is oppositely oriented from said second flow path and which includes a second additional switch, means connecting said second contact to said central terminal including parallel, oppositely oriented, uni-directional fifth and sixth flow paths respectively including third and fourth additional switches, a fifth additional switch connecting said end contact to said positive end terminal, a sixth additional switch connecting said end contact to said negative end terminal, and means for opening and closing said first, third and fifth additional switches concurrently with opening and closing of said second switch and for opening and closing said second, fourth and sixth additional switches concurrently with opening and closing of said first switch.

23. A circuit in accordance with claim 22 wherein said additional switches are solenoid actuated switches.

24. A circuit in accordance with claim 22 wherein said second, third and fourth additional switches are SCR's and said first, fifth and sixth additional switches are solenoid operated switches.

25. A circuit in accordance with claim 22 wherein said first, second, third and fourth additional switches are SCR's and said fifth and sixth additional switches are solenoid operated switches.

26. A circuit in accordance with claim 22 wherein said first and second flow paths include respective additional seventh and eighth switches, wherein said battery bank includes a first additional terminal intermediate said positive end terminal and said first intermediate terminal and a second additional terminal intermediate said second intermediate terminal and said negative end terminal, wherein said plurality of contacts are located in a series and include an additional contact located to the other side of said first contact from said second contact, and further including means connecting said additional contact to said first and second additional terminals through respective uni-directional oppositely oriented parallel seventh and eighth flow paths, and means for opening and closing said seventh additional switch concurrently with opening and closing of said second switch and for opening and closing said eighth additional switch concurrently with opening and closing of said first switch.

27. A circuit in accordance with claim 26 wherein said second, third, fourth, seventh and eighth additional switches are SCR's and said first, fifth and sixth additional switches are solenoid operated switches.

28. A circuit in accordance with claim 26 wherein said first, second, third, fourth, seventh and eighth additional switches are SCR's and said fifth and sixth additional switches are solenoid operated switches.

* * * * *